United States Patent
Wang et al.

(10) Patent No.: US 6,451,406 B1
(45) Date of Patent: Sep. 17, 2002

(54) SOLVENTLESS NODE ADHESIVE FOR HONEYCOMB

(75) Inventors: Yen-Seine Wang, San Ramon; Mark S. Caldwell, Castro Valley, both of CA (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 09/549,506

(22) Filed: Apr. 14, 2000

(51) Int. Cl.⁷ .................................................. B32B 3/12
(52) U.S. Cl. ...................... 428/116; 428/327; 428/332; 428/355 R; 428/355 EP; 428/355 CN; 428/355 N; 106/287.22; 106/287.32; 106/287.3; 156/60; 156/61; 156/326; 156/327; 156/330; 156/330.9; 156/331.1
(58) Field of Search .................... 428/116, 118, 428/323, 327, 332, 343, 355 R, 355 EP, 355 CN, 355 N; 106/287.22, 287.32, 287.3; 156/60, 61, 283, 325, 326, 327, 330, 330.9, 331.1, 331.2

(56) References Cited

U.S. PATENT DOCUMENTS

| | | |
|---|---|---|
| 3,673,058 A | 6/1972 | Jackson et al. ............... 161/68 |
| 5,217,556 A | 6/1993 | Fell .............................. 156/205 |
| 5,260,117 A | 11/1993 | Myers et al. ................ 428/196 |
| 5,290,883 A * | 3/1994 | Hosokawa et al. |
| 5,514,444 A | 5/1996 | Buyny et al. ................ 428/116 |
| 5,670,001 A | 9/1997 | Huebner et al. ............. 156/197 |
| 5,685,936 A | 11/1997 | Komine et al. ............. 156/182 |
| 5,792,295 A | 8/1998 | Huebner et al. ............. 156/197 |

* cited by examiner

*Primary Examiner*—Deborah Jones
*Assistant Examiner*—Wendy Boss
(74) *Attorney, Agent, or Firm*—Shapiro & Dupont LLP

(57) ABSTRACT

A solventless node adhesive for use in bonding honeycomb layers together. The node adhesive includes thermoset resin and thermoplastic particles dispersed in the adhesive. The node adhesive is applied to the honeycomb node lines while the thermoplastic particles remain dispersed in the adhesive. The amount of thermoplastic particles in the node adhesive is selected to keep the viscosity of the adhesive between 30 and 150 poise at room temperature. The node adhesive may be applied to the honeycomb nodes using conventional application procedures. The thermoplastic particles are dissolved during heat curing of the thermoset resin to form a thermoplastic toughened node adhesive.

19 Claims, 2 Drawing Sheets

SOLVENTLESS NODE ADHESIVE FOR HONEYCOMB

BACKGROUND OF THE INVENTION

1. Field of the Invention

The present invention relates generally to honeycomb structures and the adhesives which are used to bond the layers of the honeycomb together. More particularly, the present invention involves the development of new node adhesives which offer a number of advantages over existing rubber or thermoplastic toughened thermoset adhesives.

2. Description of Related Art

Honeycomb structures are well known and widely used in many applications where a high strength and lightweight material is required. The combined features of lightweight and strength found in honeycomb structures makes them particularly well suited for use in aircraft and other applications where high strength and low weight are required. Honeycomb structures have been made from a wide variety of materials including metals, such as aluminum. Composite materials made from resin impregnated fibers and papers have also been widely used in honeycomb structures. Thermosetting resins have typically been used as the resin matrix of choice in cases where the honeycomb is used as part of a structural member where optimum honeycomb strength is required.

One common process for fabricating honeycomb structures involves bonding multiple sheets of material together along specially oriented node lines. The node lines are offset between different layers in such a way that a honeycomb structure is formed when the layers are expanded. This type of process is commonly referred to as the "expansion" process. The expansion process is not suitable for fabricating honeycomb structures in some instances where certain thermoset matrix resins are used. For example, sheets made from certain materials which are too stiff or porous cannot be formed into honeycomb structures using the expansion process.

A fabrication process or method commonly referred to as the "corrugation" process has been used to form high strength thermoset honeycomb structures in those situations where the expansion process cannot be used. The corrugation process involves initially shaping sheets of uncured thermoset or thermoplastic material into a corrugated configuration. The corrugated sheets are cured at high temperature to form stiff corrugated sheets which are then bonded together to form the honeycomb core. The honeycomb core is then optionally coated with a matrix or dip resin. The honeycomb core is generally cut into numerous flat panels which can be used "as is" or further processed in accordance with conventional honeycomb fabrication techniques. For example, the honeycomb core may be sandwiched between sheets of various materials to form extremely strong structural panels.

The adhesive which is used to bond the layers of the honeycomb together forms an important part of any honeycomb structure. Such adhesives are commonly referred to as "node adhesives." Node adhesives are critical because the ultimate strength of the honeycomb is often directly dependent upon the strength of the adhesive bond between the honeycomb layers. This is especially true in honeycombs which utilize high strength composite materials to form the honeycomb layers.

The importance of the node adhesive has led to a continual search for new and improved bonding materials. Thermoset resins that are toughened with rubber or thermoplastic particle have been found to be especially good node adhesives. These rubber or thermoplastic toughened thermoset adhesives are made by adding from 5 to 25 weight percent rubber or thermoplastic particles to a thermoset resin such as epoxy or cyanate ester resin. An organic solvent is also added to the adhesive mixture in order to maintain the viscosity of the node adhesive at a level which allows it to be processed and applied easily to the honeycomb nodes. N-methyl-2-pyrrolidone (NMP) and dimethylformamide (DMF) are the two principal solvents used in making toughened thermoset node adhesives. These solvents have been popular because they are able to dissolve a number of different thermoplastics and they can be removed from the adhesive by vaporization during the curing process.

Although the above-described node adhesives are well suited for their intended purpose, there continues to be a need for developing new and improved node adhesives which can be used advantageously to produce lightweight and structurally strong honeycomb structures.

SUMMARY OF THE INVENTION

In accordance with the present invention, improved thermoplastic toughened thermoset node adhesives have been developed which do not require a solvent. The solventless node adhesives provide a number of advantages over prior node adhesives which contain a solvent. It was discovered that evaporation of the solvent from the adhesive during high temperature curing produces small voids in the final adhesive bond which adversely affect the bond strength. Further, residual amounts of solvent usually remain in the node adhesive even when it is cured at temperatures up to 250° C. and higher. The residual solvent detracts from overall bond strength and may present outgassing problems if the honeycomb is intended for use in a low pressure environment. Also, the solvent which evaporates during the heat forming process must be contained and disposed of in accordance with existing solvent vapor disposal procedures.

The present invention is based on the discovery that small thermoplastic particles may be incorporated into a thermosetting adhesive in amounts which are sufficient to provide a good node adhesive while at the same time not increasing the viscosity of the adhesive to levels which would require use of a solvent. It was found that small thermoplastic particles do not dissolve in thermosetting resins at room temperature. As a result, the thermosetting resin can be loaded with from 15 to 35 weight percent thermoplastic particles without increasing the viscosity of the mixture to a level which makes it unsuitable for use as a node adhesive. Upon curing at high temperature, the particles dissolve in the resin to provide a toughened resin which is especially well suited for use as a node adhesive.

The invention involves methods for making honeycombs wherein adjacent layers of the honeycomb are adhesively bonded together along a plurality of node lines. The solventless adhesive used to bond the adjacent layers of honeycomb together contains a thermoset resin, a curing agent for the thermoset resin and particles of thermoplastic resin which are suspended in the thermoset resin. The amount of thermoplastic particles suspended in the thermoset resin, as well as the temperature at which the adhesive is applied, is selected to provide a node adhesive which has a viscosity of between 10 to 180 poise at room temperature. Upon curing, the resulting honeycomb nodes have strong adhesive bonds which contain minimum voids and contains no residual solvent. The solventless node adhesive retains its strength even at elevated temperatures.

The above discussed and many other features and attendant advantages of the present invention will become better understood by reference to the following detailed description when taken in conjunction with the accompanying drawings.

DETAILED DESCRIPTION OF THE INVENTION

Solventless node adhesives in accordance with the present invention are well suited for use in making a wide variety of high strength honeycomb structures. Such structures include, for example, spacecraft bulkheads, aircraft engine nacells, high performance automobile and boat bodies, and other applications where high strength and lightweight structures are necessary.

Figure 1:
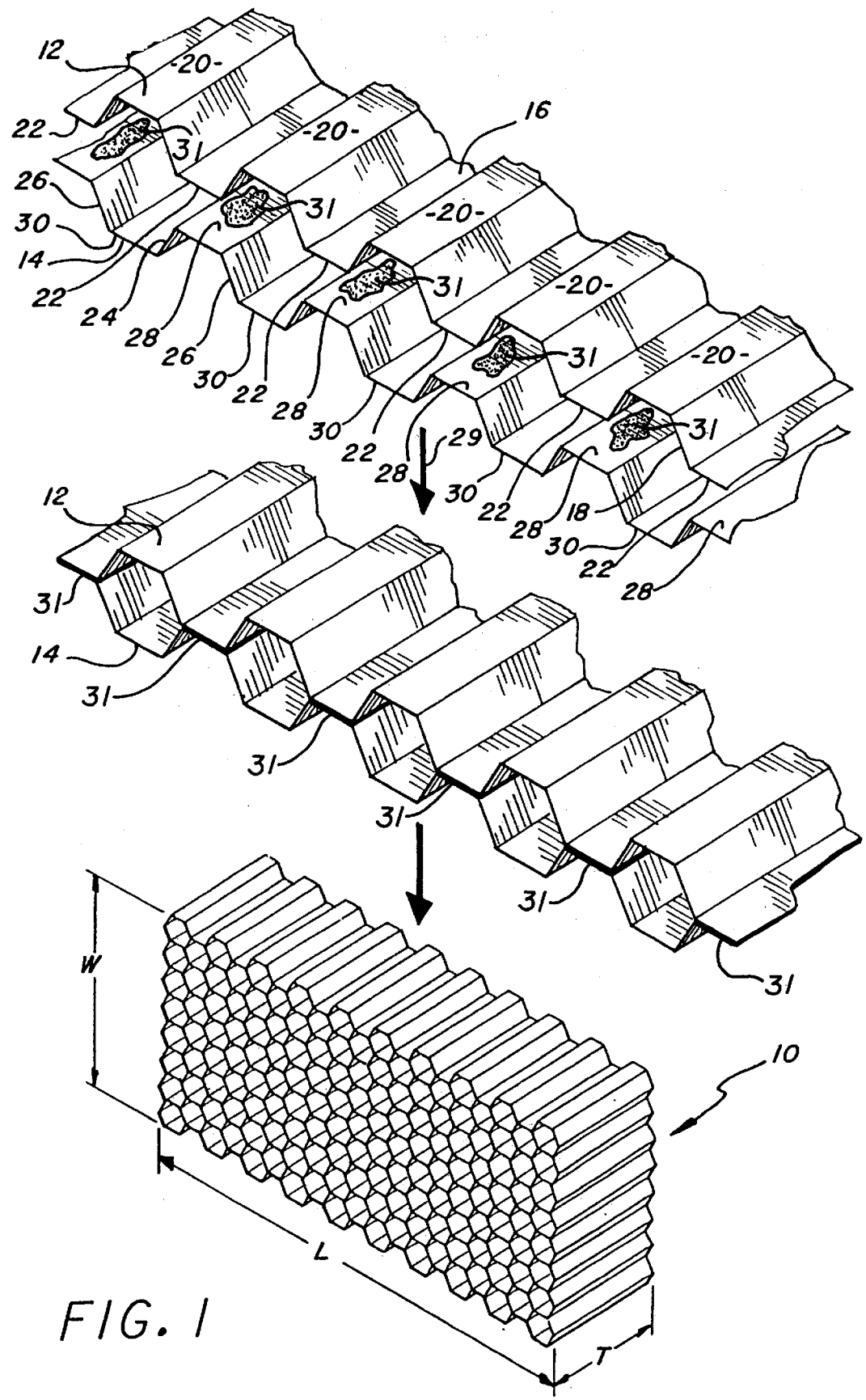
FIG. 1 is a simplified schematic representation of a honeycomb formation process utilizing solventless node adhesive in accordance with the present invention.

A simplified process showing construction of a honeycomb core from corrugated sheets utilizing a node adhesive is diagrammatically shown in FIG. 1. The process is shown utilizing only two corrugated sheets 12 and 14 with it being understood that the same process is carried out numerous times with additional corrugated sheets to obtain multi-layered honeycomb of the type shown at 10. Preferred corrugated sheets are made from composite materials which typically include fibers impregnated with a core resin.

The corrugated sheet 12 has a top surface 16 and bottom surface 18. The bottom surface 18 includes bottom node surfaces 22. The top surface 16 includes top node surfaces 20. Likewise, the lower corrugated sheet 14 includes a top surface 24 and bottom surface 26. The top surface 24 includes top node surfaces 28 and the bottom surface 26 includes node surfaces 30. As represented in FIG. 1, by the top vertical arrow 29, the two corrugated sheets 12 and 14 are bonded together using a solventless node adhesive 31 which will be described in detail below.

The node adhesive 31 bonds the top node surfaces 28 of the lower layer 14 to the bottom node surfaces 22 of the upper layer 12 as shown in the middle of FIG. 1. This process is repeated numerous times for additional corrugated sheets. In each case, the upper node surfaces 28 of the lower layer are bonded to the bottom node surfaces 22 of the upper layer. As previously mentioned, for simplicity, FIG. 1 shows only the bonding of two layers together with it being understood that this process is repeated numerous times in order to achieve a honeycomb of the type shown at 10. The basic principles and procedures used in the corrugation honeycomb formation process which are well known to those skilled in the art. The present invention also may be used in forming honeycomb by the expansion process. The present specification is limited to a description of forming honeycomb by the corrugation process. It will be understood that the same description is equally applicable in accordance with the present invention to formation of honeycomb using the expansion process.

The solventless node adhesives in accordance with the present invention may be used in making a wide variety of honeycomb structures. The solventless node adhesive is particularly well suited for replacing thermoplastic toughened thermoset resin node adhesives which presently utilize a solvent. Exemplary honeycomb cores which may be bonded together utilizing the solventless node adhesive include glass and carbon fiber composite materials which have epoxy, phenolic, polyimide and cyanate as the matrix resin. The solventless node adhesive may be used in any situation where a thermoplastic toughened thermoset node adhesive either has been used or may be required. For example, the solventless node adhesive may be used in expansion processes for making honeycomb.

Figure 2:
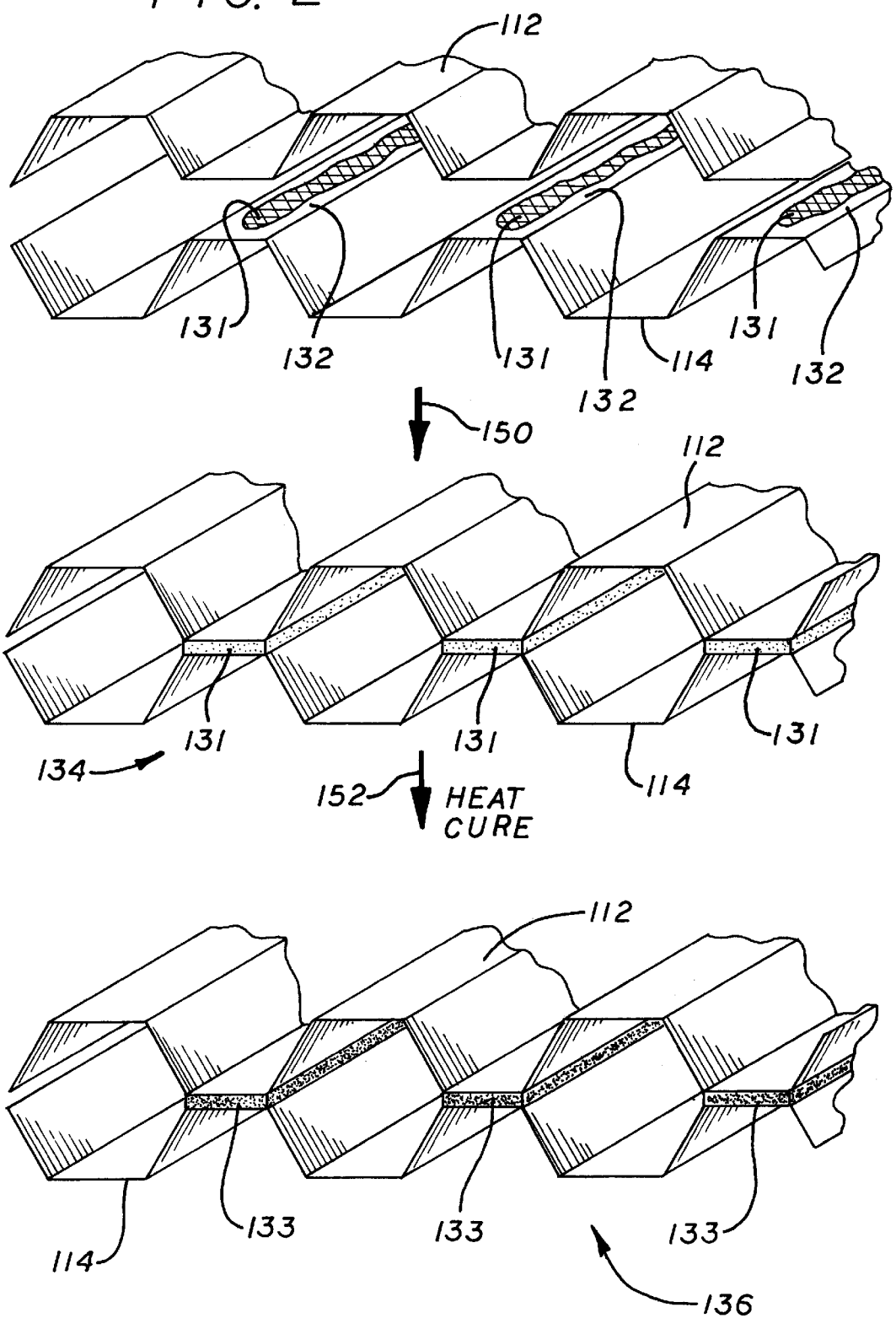
FIG. 2 is a more detailed view showing an exemplary honeycomb formation process utilizing a solventless node adhesive in accordance with the present invention.

A more detailed diagrammatic representation of a method for making honeycomb using solventless node adhesive is shown in FIG. 2. Corrugated layer 112 is bonded to corrugated layer 114 using the solventless node adhesive 131 which is applied along node line 132. The solventless adhesive 131 includes one or more thermoset resins in which particles of thermoplastic resin are suspended.

As represented by arrow 150, the two corrugated layers 112 and 114 are pressed together to form uncured honeycomb 134. An important aspect of the present invention is that the solventless adhesive 131 be maintained at a temperature which prevents the thermoplastic particles from dissolving prior to heat curing. The undissolved thermoplastic particles are represented by the stippling of the node adhesive 131 as shown in the uncured honeycomb 134. As represented by arrow 152, the node adhesive 131 is heat cured to form the final honeycomb 136 which includes a cured node adhesive 133. During the heat curing process, the thermoplastic particles are dissolved.

Thermoset resins which may be used to form the solventless node adhesive include cyanate and epoxy thermoset resins. When only one resin is used, cyanate thermosetting resins are preferred. Adhesives utilizing a blend of cyanate and epoxy resin are preferred. Addition of epoxy to cyanate resin reduces the cost of adhesive as well as improving the toughness. Cyanate resins co-cure with epoxy resins so that a separate curing agent is not required. Preferred resin blends will contain from 40 to 90 weight percent cyanate resin and from 10 to 60 weight percent epoxy resin. An exemplary cyanate resin is a thermoset cyanate identified as L-10 which is available from Ciba Geigy (Brewster, N.Y.). Other suitable cyanate resins include those which have viscosities which are equivalent to L-10. A preferred exemplary epoxy is EPICLON 830 which is available from Dainippon (Osaka, Japan). Other suitable epoxies include GY285, GY6008 which are also available from Ciba Geigy. The amount of thermoset resin (i.e., either cyanate or cyanate/epoxy blend) present in the solventless node adhesive can range from 65 to 85 weight percent.

The thermoplastic particles may be made from thermoplastic resins such as polyethersulfone (PES), polyetherimide (PEI), polysulfone, polyvinyl butyral and polyvinyl formal. Polyetherimide particles marketed under the tradename ULTEM are preferred. ULTEM particles are available from General Electric (Pittsfield, Mass.). The thermoplastic particles should have sizes ranging from 10 to 500 microns with sizes of 10 to 100 microns being preferred. ULTEM 1000 is a preferred thermoplastic powder wherein the powder is pulverized to provide particles which are 100 $\mu$ or less in size. Micropulverized densified PES particles made according to U.S. Pat. No. 4,945,154 are also preferred. The amount of thermoplastic particles present in the solventless node adhesive is between 15 to 35 weight percent.

The ingredients in the solventless node adhesive (i.e., thermoset resin(s) and thermoplastic particles) are selected to provide a node adhesive which has a viscosity of at least 30 poise at room temperature. The ingredients are mixed together in accordance with conventional epoxy formulation procedures. It is important that the viscosity be maintained above this lower limit in order for the adhesive to be applied to the corrugated panel nodes using conventional procedures. If the solventless node adhesive is too viscous, it cannot be adequately applied to the corrugated panel nodes. The viscosity of the adhesive should be kept below about 150 poise and preferably below about 90 poise. The temperature of the adhesive during application to the node surfaces is preferably at room temperature, i.e., between 24° C. and 35° C.

The node adhesive is heat cured after the adhesive has been applied and the nodes pressed together. Heat curing of the adhesive is carried out at a sufficient temperature and for a sufficient time to provide complete curing of the adhesive to form strong node bonds. Typically, the adhesive is cured at temperatures ranging from 177° C. to 210° C. for periods ranging from 60 minutes to 90 minutes.

Examples of practice are as follows:

EXAMPLE 1

Node adhesives were prepared using L-10 cyanate resin, Epiclon 830 epoxy ester resin and ULTEM powder. The various amounts of each ingredient for the adhesives is set forth in Table 1.

TABLE 1

|  | A (wt %) | B (wt %) | C (wt %) |
|---|---|---|---|
| L-10 | 36 | 30.6 | 32.4 |
| Epiclon 830 | 36.1 | 41.6 | 44.1 |
| Ultem powder | 27.8 | 27.8 | 23.5 |
| Peel Strength (lbs/in) at 210° C. | 25.7 | 25.4 | 18.5 |

The node adhesives were used to bond two sheets of composite material together. The composite material sheets were made up of corrugated phenolic and glass fabric prepreg. The amount of adhesive used to bond the two sheets of material together was approximately 5 to 10 mils thick. The adhesive was applied to the sheets at room temperature and heat cured at 204° C. for 60 minutes. Peel strength for each adhesive at 210° C. was determined according to ASTM D-171-76. The results of the peel strength tests are also set forth in Table 1. The viscosities of the adhesives at room temperature were all between 30 and 150 poise.

EXAMPLE 2

A second group of node adhesives can be made having the formulations set forth in Table 2.

TABLE 2

|  | A (wt %) | B (wt %) | C (wt %) |
|---|---|---|---|
| L-10 | 30.6 | 67 | 67 |
| Epiclon 830 | 41 | — |  |
| PES powder | 27.8 | 33 |  |
| Ultem powder |  |  | 33 |

The adhesives are used to bond corrugated sheets together in the same manner as Example 1. The resulting peel strength and viscosity for each adhesive is expected to be equivalent to the node adhesives set forth in Example 1.

The peel strengths obtained with the solventless node adhesives of the present invention compare favorably with conventional adhesives such as polyamideimide adhesives which exhibit peel strengths on the order of 5–10 in/lbs at 210° C.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments, but is only limited by the following claims.

What is claimed is:

1. A method for making a honeycomb wherein adjacent layers of the honeycomb are adhesively bonded together along a plurality of node lines, said method comprising the steps of:

providing a plurality of layers which are to be adhesively bonded together along node lines; and applying a solventless adhesive along said node lines wherein said solventless adhesive consists essentially of a thermoset resin and particles of thermoplastic resins which are suspended in said thermoset resin and wherein the temperature of said solventless adhesive and the amount of thermoplastic particles suspended therein provide a solventless adhesive which has a viscosity of between 10 and 180 poise at room temperature;

placing said layers together with said solventless adhesive thereon to form a honeycomb precursor; and heating said honeycomb precursor for a sufficient time and at a sufficient temperature to cure said solventless adhesive to provide adhesive bonding of the adjacent layers together along the node lines.

2. A method for making a honeycomb according to claim 1 wherein said solventless adhesive comprises a thermoset resin selected from the group consisting of epoxy and cyanate ester resins.

3. A method for making a honeycomb according to claim 2 wherein said thermoset resin consists essentially of 40 to 90 weight percent cyanate ester resin and 10 to 60 weight percent epoxy resin.

4. A method for making a honeycomb according to claim 1 wherein said thermoplastic particles consist essentially of thermoplastic selected from the group consisting of polyamideimide, polyetherimide, polyethersulfone, polysulfone, polyvinyl butyral and polyvinyl formal.

5. A method for making a honeycomb according to claim 4 wherein said thermoplastic particles consist essentially of polyetherimide.

6. A method for making a honeycomb according to claim 3 wherein said thermoplastic particles consist essentially of polyetherimide.

7. In a honeycomb comprising adjacent layers which are adhesively bonded together with a node adhesive along a plurality of node lines, wherein the improvement comprises using a solventless node adhesive along said plurality of node lines to bond said adjacent layers together wherein said solventless adhesive, when applied to said node lines, consists essentially of a thermoset resin and particles of thermoplastic resin which are suspended in said thermoset resin and wherein the temperature of said solventless adhesive and the amount of thermoplastic particles suspended therein are selected to provide a solventless adhesive which has a viscosity of between 10 and 180 poise at room temperature.

8. An improved honeycomb according to claim 7 wherein said solventless adhesive comprises a thermoset resin selected from the group consisting of epoxy and cyanate ester resins.

9. An improved honeycomb according to claim 8 wherein said thermoset resin consists essentially of 40 to 90 weight percent cyanate ester resin and 10 to 60 weight percent epoxy resin.

10. An improved honeycomb according to claim 7 wherein said thermoplastic particles consist essentially of thermoplastic selected from the group consisting of polyamideimide, polyetherimide, polyethersulfone, polyvinyl butyral, polysulfone and polyvinyl formal.

11. An improved honeycomb according to claim 10 wherein said thermoplastic particles consist essentially of polyetherimide.

12. An improved honeycomb according to claim 9 wherein said thermoplastic particles consist essentially of polyetherimide.

13. A solventless node adhesive for use in bonding honeycomb layers together, said solventless node adhesive consisting essentially of:
   65 and 85 weight percent thermoset resin; and
   15 to 35 weight percent thermoplastic particles
wherein the viscosity of said solventless adhesive at room temperature is between 10 and 180 poise.

14. A solventless node adhesive according to claim 13 wherein said thermoset resin is selected from the group consisting of epoxy and cyanate ester resins.

15. A solventless node adhesive according to claim 13 wherein said thermoset resin consists essentially of 40 to 90 weight percent cyanate ester resin and 10 to 60 weight percent epoxy resin.

16. A solventless node adhesive according to claim 15 wherein said thermoplastic particles are selected from the group consisting of polyamideimide, polyetherimide, polyethersulfone, polyvinyl butyral, polyvinyl formal and polysulfone.

17. A solventless node adhesive according to claim 16 wherein the particle size of said thermoplastic particles is from 10 to 500 microns.

18. A solventless node adhesive according to claim 17 wherein said thermoplastic particles are polyetherimide.

19. A solventless node adhesive according to claim 17 wherein said thermoplastic particles are polyethersulfone.

* * * * *